(12) United States Patent
Nakamura

(10) Patent No.: US 9,469,970 B2
(45) Date of Patent: Oct. 18, 2016

(54) HYDRAULIC EXCAVATOR

(71) Applicant: KOMATSU LTD., Tokyo (JP)

(72) Inventor: Naoto Nakamura, Hirakata (JP)

(73) Assignee: KOMATSU LTD., Tokyo (JP)

( * ) Notice: Subject to any disclaimer, the term of this patent is extended or adjusted under 35 U.S.C. 154(b) by 217 days.

(21) Appl. No.: 14/345,440

(22) PCT Filed: Feb. 18, 2013

(86) PCT No.: PCT/JP2013/053814
§ 371 (c)(1),
(2) Date: Mar. 18, 2014

(87) PCT Pub. No.: WO2014/125640
PCT Pub. Date: Aug. 21, 2014

(65) Prior Publication Data
US 2016/0002884 A1  Jan. 7, 2016

(51) Int. Cl.
*B60R 3/02* (2006.01)
*E02F 9/22* (2006.01)
*B60R 3/00* (2006.01)
*E02F 9/08* (2006.01)
(Continued)

(52) U.S. Cl.
CPC . *E02F 9/22* (2013.01); *B60R 3/00* (2013.01); *B62D 33/063* (2013.01); *E02F 9/0808* (2013.01); *E02F 9/0833* (2013.01); *E02F 9/0866* (2013.01); *E02F 9/0883* (2013.01); *E02F 9/163* (2013.01); *E02F 9/24* (2013.01)

(58) Field of Classification Search
CPC ........ E02F 9/22; E02F 9/265; E02F 9/2235; E02F 9/2246; B60R 3/02
See application file for complete search history.

(56) References Cited

U.S. PATENT DOCUMENTS 5,339,919 A * 8/1994 Boyd .................... E02F 9/0833
  182/127
6,354,678 B1 * 3/2002 Oertley ................. B62D 55/30
  305/143

(Continued)

FOREIGN PATENT DOCUMENTS

JP    9-111809 A    4/1997
JP    2001-180381 A    7/2001
(Continued)

OTHER PUBLICATIONS

The International Search Report for the corresponding international application No. PCT/JP2013/053814, issued on Feb. 18, 2013.

(Continued)

*Primary Examiner* — Hau Phan
(74) *Attorney, Agent, or Firm* — Global IP Counselors, LLP

(57) ABSTRACT

A hydraulic excavator includes a traveling unit and a revolving unit mounted on the traveling unit. The revolving unit includes a revolving frame as a base, right and left side sections, a cab, a hand rail and a grip. The right and left side sections are disposed on right and left sides of the revolving unit. The cab is provided at a first of the right and left side sections. The hand rail is provided at a front edge on a second of the right and left side sections. The hand rail extends upward from the front edge toward a rear of the revolving unit. The grip is provided below the hand rail and on a side surface of the revolving frame. The traveling unit includes a track frame, and a step provided on a side surface of the track frame below the hand rail.

8 Claims, 6 Drawing Sheets

(51) Int. Cl.
 *B62D 33/063* (2006.01)
 *E02F 9/16* (2006.01)
 *E02F 9/24* (2006.01)

(56) References Cited

U.S. PATENT DOCUMENTS

| | | | | |
|---|---|---|---|---|
| 6,948,783 | B2* | 9/2005 | Hoff | E02F 9/02 305/144 |
| 8,644,964 | B2* | 2/2014 | Hendron | E02F 9/265 700/20 |
| 2009/0294213 | A1* | 12/2009 | Kim | B60R 3/02 182/127 |
| 2010/0219008 | A1* | 9/2010 | Isaka | B60K 11/04 180/68.1 |
| 2011/0146283 | A1* | 6/2011 | Narazaki | E02F 9/2235 60/701 |
| 2012/0067660 | A1* | 3/2012 | Kashu | B60K 13/04 180/296 |
| 2012/0260637 | A1* | 10/2012 | Sato | E02F 9/2246 60/277 |
| 2013/0141889 | A1* | 6/2013 | Tsuchiya | E02F 9/0858 361/821 |
| 2014/0200795 | A1* | 7/2014 | Kawaguchi | F02D 31/008 701/110 |
| 2015/0299989 | A1* | 10/2015 | Nagato | E02F 3/435 701/34.4 |

FOREIGN PATENT DOCUMENTS

| | | |
|---|---|---|
| JP | 2004-143887 A | 5/2004 |
| JP | 2009-203675 A | 9/2009 |
| JP | 2010-70927 A | 4/2010 |
| JP | 2010-163775 A | 7/2010 |
| JP | 2011-12661 A | 1/2011 |
| JP | 2011-247058 A | 12/2011 |

OTHER PUBLICATIONS

The JP Office Action for the corresponding Japanese application No. 2013-539062, issued on Apr. 15, 2014.
The Office Action for the corresponding Japanese application No. 2013-539062, issued on Aug. 12, 2014.

* cited by examiner

HYDRAULIC EXCAVATOR

CROSS-REFERENCE TO RELATED APPLICATIONS

This application is a U.S. National stage application of International Application No. PCT/JP2013/053814, filed on Feb. 18, 2013.

BACKGROUND

1. Field of the Invention

The present invention relates to a hydraulic excavator where an operator is able to ascend and descend the hydraulic excavator for maintenance work.

2. Background Art

Tanks such as a fuel tank and a hydraulic oil tank are mounted in a revolving unit at an upper portion of the hydraulic excavator. The hydraulic excavator is configured such that the operator is able to ascend and descend up to the vicinity of the tanks in order to supply fuel and perform maintenance work of the tank (refer to Japanese Laid Open Patent Application Publication No. 2009-203675).

The hydraulic excavator according to Japanese Laid Open Patent Application Publication No. 2009-203675 is provided with a step on a traveling unit and is provided with a hand rail at the front position on the right side of the revolving unit. The hand rail is arranged above the middle of the step so that the operator can grasp the hand rail when he ascends the step (refer to Japanese Laid Open Patent Application Publication No. 2009-203675). Accordingly, in the hydraulic excavator, the operator can ascend the step while holding the hand rail with both hands.

SUMMARY

In hydraulic excavators in recent years, it has become increasingly necessary to arrange a selective catalytic reduction (SCR) apparatus for exhaust treatment. Since it is necessary for a reducing agent used in the selective catalytic reduction apparatus to be kept within a predetermined temperature range, it is desirable that a tank storing the reducing agent (a reducing agent tank) be arranged at a location separated from an engine or the like which generates heat. From such a point of view, it is effective to arrange the reducing agent tank at the front position on the right side of the revolving unit as described above. However, when the reducing agent tank is arranged at such a position, the right side of the revolving unit protrudes to the front and it is difficult for the hand rail to be arranged above the middle of the step.

In addition, a method for arranging the step at the anterior position may be considered. However, such a method is not preferable since the step is moved close to driving wheels and idlers which wind soil up and deposit the soil on the step.

The object of the present invention is to provide a hydraulic excavator so that an operator can easily ascend and descend a step on a traveling unit even if a revolving unit extends to the front and the position of the step is positioned relatively to the rear compared to a front edge of the revolving unit.

A hydraulic excavator according to a first aspect of the present invention is provided with a traveling unit and a revolving unit. The revolving unit is mounted on the traveling unit and includes a revolving frame as a base. The revolving unit includes a right side section on the right side in a left and right direction of the revolving unit with regard to a center line of the revolving unit, which extends in the forward and backward direction of the revolving unit, and a left side section on the left side in the left and right direction of the revolving unit with regard to the center line. The revolving unit includes a cab, a hand rail, and a grip. The cab is provided at either one of the right side section or the left side section. The hand rail is provided at a front edge on the side of the revolving unit at the other of the right side section or the left side section and extends upward from the front edge toward the rear of the revolving unit. The grip is provided below the hand rail and on a side surface of the revolving frame. The traveling unit includes a track frame and a step. The step is provided on a side surface of the track frame below the hand rail.

In the hydraulic excavator, the bottom edge section of the hand rail at the front edge of the revolving unit may be positioned in front of the middle of the step in the forward and backward direction of the revolving unit in a case where the revolving unit is positioned such that the forward and backward direction of the revolving unit is identical to the forward and backward direction of the traveling unit. Furthermore, the grip may be positioned behind the middle of the step in the forward and backward direction of the revolving unit.

The step may be a front step and the bottom edge section of the hand rail at the front edge of the revolving unit be positioned in front of the middle of the front step in the forward and backward direction of the revolving unit in a case where the revolving unit is positioned such that the forward direction of the revolving unit is identical to the forward direction of the traveling unit. Furthermore, the grip may be positioned behind the middle of the front step in the forward and backward direction of the revolving unit.

The traveling unit may further have a rear step. Then, the bottom edge section of the hand rail at the front edge of the revolving unit may be positioned in front of the middle of the rear step in the forward and backward direction of the revolving unit in a case where the revolving unit is positioned such that the forward direction of the revolving unit is identical to the backward direction of the traveling unit. Furthermore, the grip may be positioned to the rear of the middle of the rear step in the forward and backward direction of the revolving unit.

The revolving unit may further have a first deck guard and a second deck guard. The first deck guard may be provided on the side surface of the revolving frame at a side where the grip is positioned. The second deck guard may be arranged on an extension line of the first deck guard. Furthermore, the grip may be arranged on the side surface of the revolving frame between the first deck guard and the second deck guard.

The bottom edge of the grip may be positioned above a bottom side on the side surface of the revolving frame.

The revolving unit may further have a mirror provided behind the grip in the forward and backward direction of the revolving unit.

The revolving unit may further have an engine, a selective catalytic reduction apparatus, and a reducing agent tank. The selective catalytic reduction apparatus treats exhaust from the engine. The reducing agent tank is a tank for storing reducing agent. Furthermore, the reducing agent tank may be arranged at a side section where the hand rail is provided out of the right side section and the left side section.

The cab may be arranged at the left side section. Furthermore, the hand rail may be arranged at the right side section.

In the hydraulic excavator according to the present invention, the hand rail and the grip for ascending are provided on the revolving unit. Accordingly, the operator is able to ascend and descend the steps by grasping the grip with the left hand and the hand rail with the right hand. As such, it is possible for the operator to easily move on the revolving unit even on a hydraulic excavator where the revolving unit extends to the front and the position of the step is relatively to the rear compared to the front edge of the revolving unit.

DETAILED DESCRIPTION OF THE EMBODIMENT(S)

Entire Configuration

Figure 1:
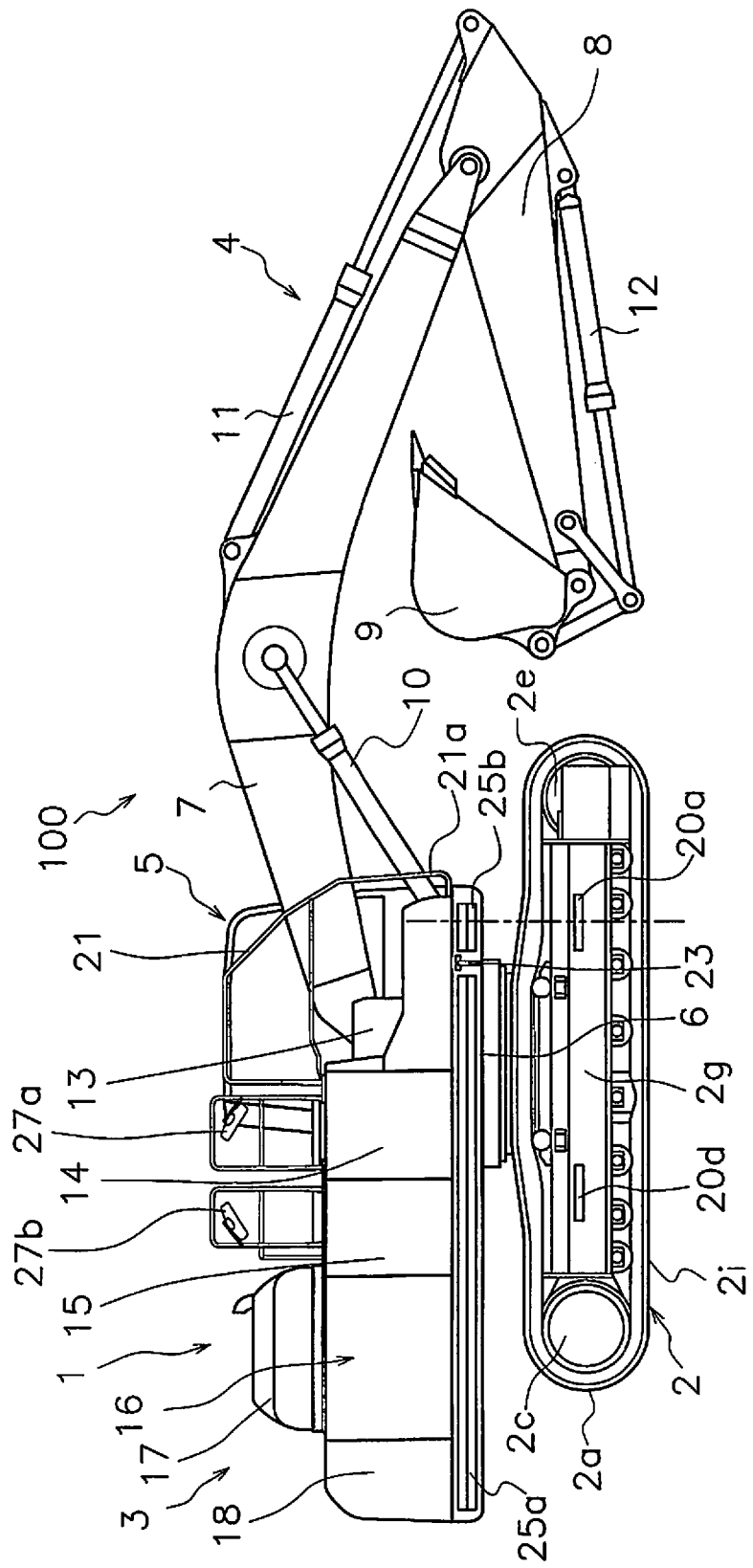
FIG. 1 is a side view of a hydraulic excavator according to a first embodiment of the present invention.
Figure 2:
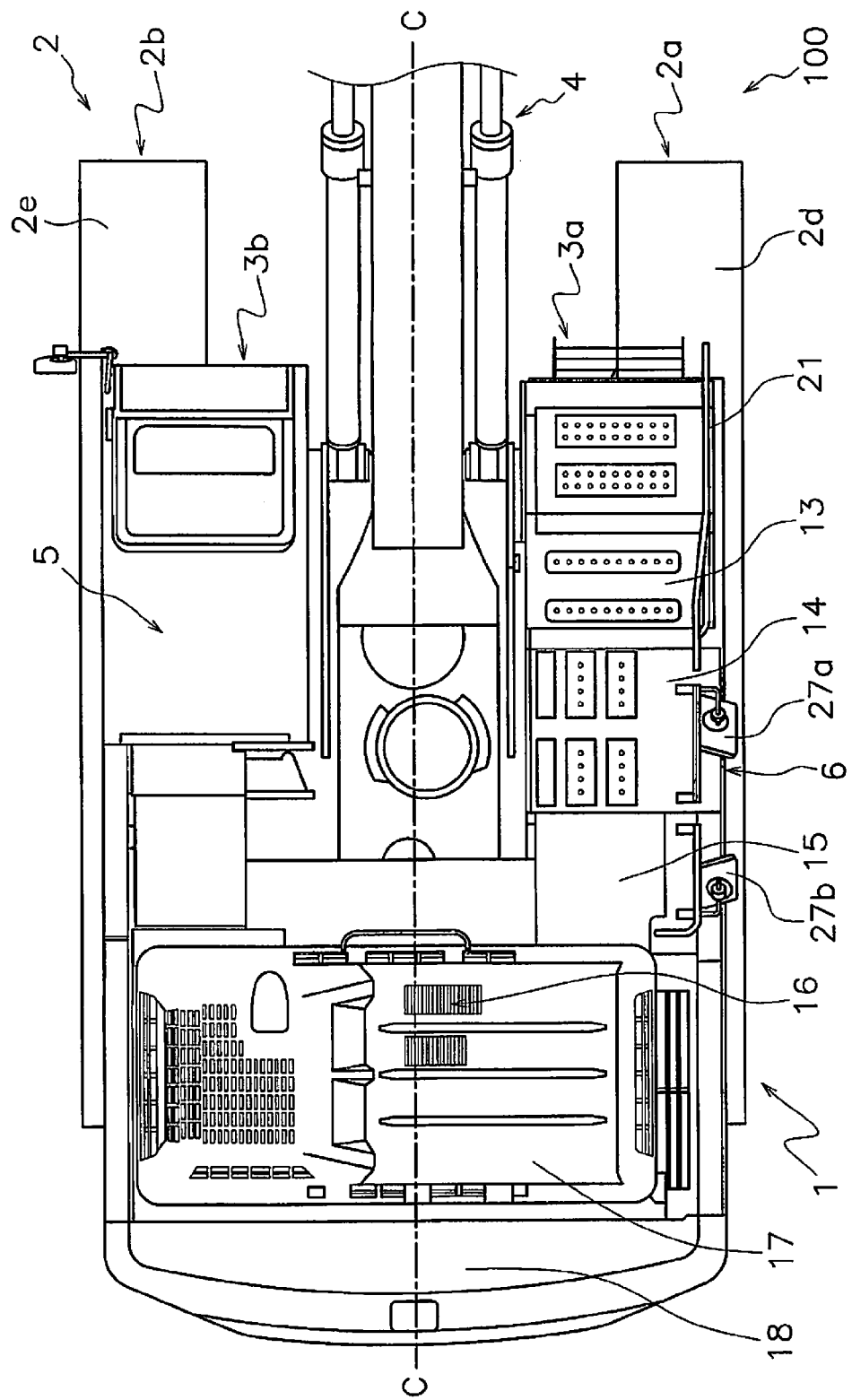
FIG. 2 is a top view of a hydraulic excavator according to the first embodiment of the present invention.
Figure 3:
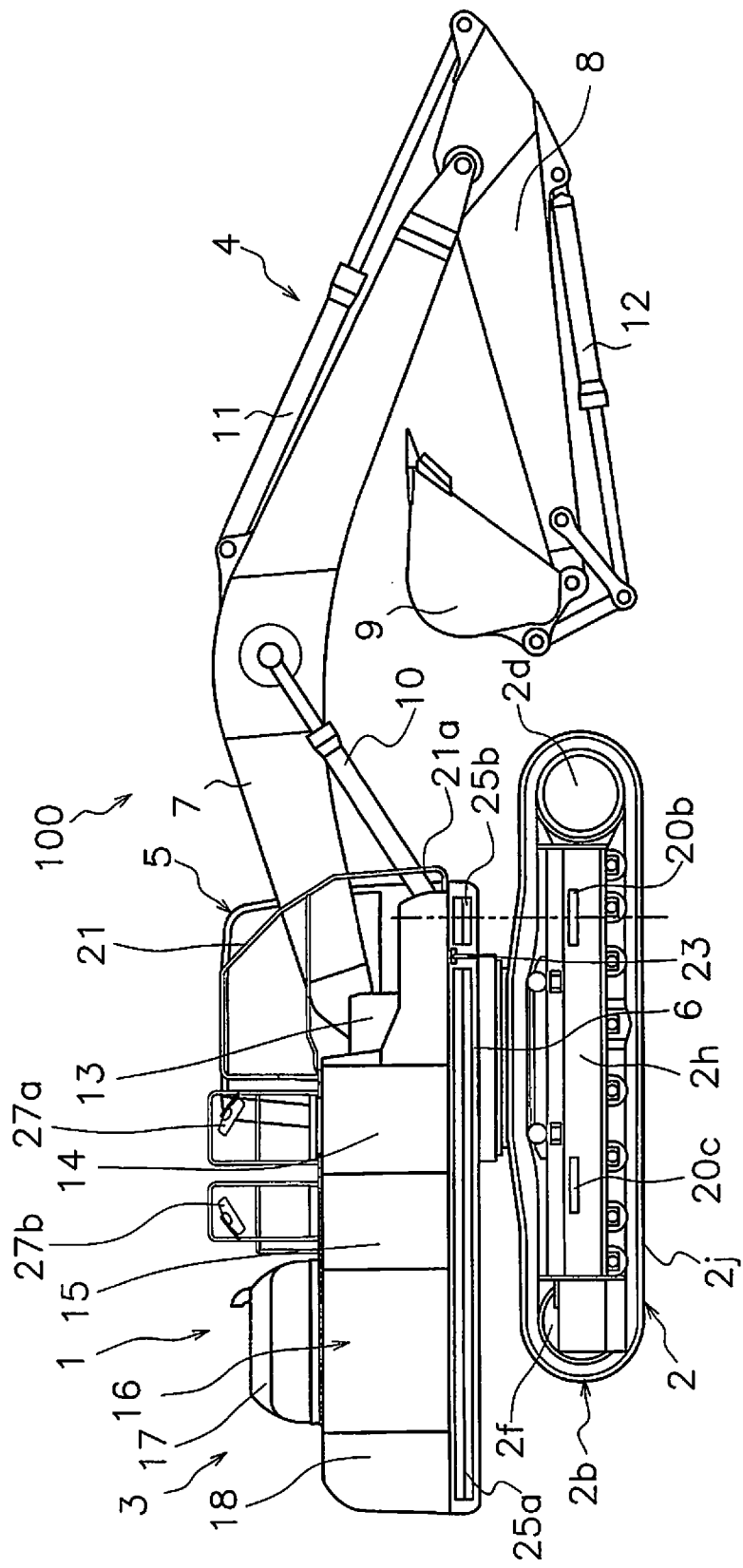
FIG. 3 is a side view of the hydraulic excavator of FIG. 1.

A hydraulic excavator 100 according to an embodiment of the present invention is shown in FIG. 1 to FIG. 3. FIG. 1 and FIG. 3 are side views of the hydraulic excavator 100. FIG. 2 is a top view of the hydraulic excavator 100. Here, FIG. 3 shows a side view of an appearance where a revolving unit 3 of FIG. 1 is rotated by 180 degrees. The hydraulic excavator 100 is provided with a vehicle body 1 and a working implement 4.

The vehicle body 1 includes a traveling unit 2 and the revolving unit 3. The traveling unit 2 includes a pair of traveling apparatuses 2a and 2b. The traveling apparatuses 2a and 2b respectively have driving wheels 2c and 2d, idlers 2e and 2f, track frames 2g and 2h, and crawler tracks 2i and 2j. The driving wheels 2c and 2d and the idlers 2e and 2f are mounted in the track frames 2g and 2h. The traveling apparatuses 2a and 2b drive the driving wheels 2c and 2d using the driving force from an engine which is not described in the diagram. The crawler tracks 2i and 2j are driven and the idlers 2e and 2f which are hooked to the crawler tracks 2i and 2j also rotate due to the driving of the driving wheels 2c and 2d. The hydraulic excavator 100 travels due to the driving of the crawler tracks 2i and 2j.

Here, in the description described below, the forward direction of the traveling unit 2 means a direction from the driving wheels 2c and 2d to the idlers 2e and 2f. The backward direction of the traveling unit 2 means a direction from the idlers 2e and 2f to the driving wheels 2c and 2d. The left and right direction of the traveling unit 2 means a left and right direction when one is facing toward the forward direction of the traveling unit 2. In addition, the forward and backward direction of the revolving unit 3 means a forward and backward direction as viewed from the operator seated in a cab 5. In addition, the left and right direction or the side direction of the revolving unit 3 means a left and right direction as viewed from the operator described above. Here, in the present embodiment, "the forward and backward direction of the traveling unit 2 is identical to the forward and backward direction of the revolving unit 3" means either the forward direction of the traveling unit 2 is identical to the forward direction of the revolving unit 3 or the forward direction of the traveling unit 2 is identical to the backward direction of the revolving unit 3.

With reference to FIG. 1 and FIG. 3, the traveling apparatus 2a is a traveling apparatus positioned on the right side of the traveling unit 2 in the left and right direction of the traveling unit 2. The traveling apparatus 2b is a traveling apparatus which is positioned on the left side of the traveling unit 2 in the forward and backward direction of the traveling unit 2. The traveling apparatus 2a includes the driving wheel 2c, the idler 2e, the track frame 2g, and the crawler track 2i. The traveling apparatus 2b includes the driving wheel 2d, the idler 2f, the track frame 2h, and the crawler track 2j.

The revolving unit 3 is mounted onto the traveling unit 2. The revolving unit 3 is configured to be able to rotate with regard to the traveling unit 2. As shown in FIG. 1 and FIG. 3, the revolving unit 3 includes a revolving frame 6 as a base. As shown in FIG. 2, the revolving unit 3 includes a right side section 3a and a left side section 3b. The right side section 3a is a region on the left front of the revolving unit 3 in the front and back directions and in left and right directions of the revolving unit 3. That is, the right side section 3a is positioned on the right side in the right and left direction of the revolving unit 3 with regard to a center line C-C of the revolving unit 3 which extends in the forward and backward direction of the revolving unit 3. The left side section 3b is a region on the right front of the revolving unit 3 in the front and back directions and in left and right directions of the revolving unit 3. That is, the left side section 3b is positioned on the left side in the right and left direction of the revolving unit 3 with regard to the center line C-C.

The cab 5 is arranged on the left side section 3b. A reducing agent tank 13, a fuel tank 14, and a hydraulic oil tank 15 are arranged in the right side section 3a. The revolving unit 3 further includes an engine room 16 and a counterweight 18 on the rear of the revolving unit 3. The cab 5, the reducing agent tank 13, the fuel tank 14, the hydraulic oil tank 15, engine room 16, and the counterweight 18, which are described above, are mounted onto the revolving frame 6. That is, the revolving unit 3 at least includes an engine, a selective catalytic reduction apparatus, and the reducing agent tank 13.

The fuel tank 14 stores fuels for driving the engine which is in the engine room 16 and which is not shown in the diagram. The fuel tank 14 is arranged in front of the hydraulic oil tank 15 in the forward and backward direction of the revolving unit 3. The hydraulic oil tank 15 stores hydraulic oil discharged from a hydraulic pump which is not shown in the diagram. The reducing agent tank 13 stores reducing agent used in the selective catalytic reduction apparatus which is in the engine room 16 and which is not shown in the diagram. The selective catalytic reduction apparatus treats exhaust from the engine described above. The reducing agent is, for example, aqueous urea. The reducing agent tank 13 is arranged in front of the fuel tank 14 in the forward and backward direction of the revolving unit 3. The reducing agent tank 13, the fuel tank 14, and the hydraulic oil tank 15 are arranged to be lined up in the forward and backward direction of the revolving unit 3.

The engine room 16 accommodates devices such as the engine and the hydraulic pump which are not shown in the diagram. Furthermore, the selective catalytic reduction apparatus which treats exhaust from the engine is also arranged in the engine room 16. The engine room 16 is arranged behind the cab 5, the reducing agent tank 13, the fuel tank 14, and the hydraulic oil tank 15 in the forward and backward direction of the revolving unit 3. An upper part of the engine room 16 is covered by an engine cover 17. The counterweight 18 is arranged behind the engine room 16 in the forward and backward direction of the revolving unit 3.

The working implement 4 is attached at a central position of the front section of the revolving unit 3 in the front and back and left and right direction of the revolving unit 3. The working implement 4 includes a boom 7, an arm 8, a bucket 9, a boom cylinder 10, an arm cylinder 11, and a bucket cylinder 12. The base end portion of the boom 7 is joined to the revolving unit 3 so as to be able to rotate. In addition, the base end portion of the arm 8 is joined to the front end portion of the boom 7 so as to be able to rotate. The bucket 9 is joined to a front end portion of the arm 8 so as to be able to rotate. The boom cylinder 10, the arm cylinder 11, and the bucket cylinder 12 are hydraulic cylinders and are driven using the hydraulic oil discharged from the hydraulic pump. The boom cylinder 10 operates the boom 7. The arm cylinder 11 operates the arm 8. The bucket cylinder 12 operates the bucket 9. The working implement 4 is driven by driving the cylinders 10, 11 and 12.

Configuration of Member for Ascending and Descending

The hydraulic excavator 100 is provided with the following members as members for ascending and descending. As shown in FIG. 1 and FIG. 3, the traveling apparatus 2a includes a step 20a and a step 20d. The traveling apparatus 2b includes a step 20b and a step 20c. The steps 20a and 20d are provided on the side surface of the track frame 2g. The steps 20b and 20c are provided on the side surface of the track frame 2h. The step 20a is used when the operator ascends onto the revolving unit 3 (for example, to a fuel supply port in the fuel tank 14 or a reducing agent supply port in the reducing agent tank 13) in a case where the forward direction of the traveling unit 2 is identical to the forward direction of the revolving unit 3. The step 20b is used when the operator ascends onto the revolving unit 3 in a case where the forward direction of the traveling unit 2 is identical to the backward direction of the revolving unit 3. The step 20c is used when the operator gets into the cab 5 in a case where the forward direction of the traveling unit 2 is identical to the forward direction of the revolving unit 3. The step 20d is used when the operator gets into the cab 5 in a case where the forward direction of the traveling unit 2 is identical to the backward direction of the revolving unit 3.

The revolving unit 3 includes a hand rail 21 and a grip 23. The hand rail 21 is arranged on the right side section 3a of the revolving unit 3. In more detail, the hand rail 21 is provided at the front edge (the front edge is referred to below as the first front edge) on the side of the right side section 3a of the revolving unit 3. The hand rail 21 extends upward from the first front edge to the rear of the revolving unit 3. The rear edge (the rear edge is referred to below as the first rear edge) of the hand rail 21 is attached to the fuel tank 14. The reducing agent tank 13 is arranged close to the hand rail 21. That is, the reducing agent tank 13 is arranged at the side section, where the hand rail 21 is provided, out of the right side section 3a and the left side section 3b. Here, the hand rail 21 is not only grasped by the operator when an operator 30 is ascending or descending the step 20a or the step 20b, but also when the operator is performing work on the revolving unit 3, which is described later.

The grip 23 is detachably attached to the side surface of the revolving frame 6. The grip is generally U-shaped with a top end portion and a bottom end portion that are curved toward the side surface of the revolving frame 6. A tip end of the top end portion is attached to the revolving frame 6, and a tip end of the bottom end portion of the grip 23 is separated from the revolving frame 6. The grip 23 is positioned below the hand rail 21. The hand rail 21 includes a bottom edge section 21a at the first front edge. The grip 23 and the bottom edge section 21a are grasped by the operator when the operator is ascending onto the revolving unit using the step 20a or the step 20b. Accordingly, the distance between the grip 23 and the bottom edge section 21a is longer than the shoulder width of a typical adult person and is shorter than the distance from the right elbow to the left elbow when a typical adult person extends both arms horizontally. For example, the distance between the grip 23 and the bottom edge section 21a can be approximately 600 mm. In addition, the height from the step 20a or the step 20b to the grip 23 in the vertical direction and the height from the step 20a or the step 20b to the bottom edge section 21a in the vertical direction can be set within reach of a left arm or a right arm of an adult person standing on the step 20a or the step 20b.

As shown in FIG. 1, the bottom edge section 21a of the hand rail 21 is positioned in front of the middle of the step 20a in the forward and backward direction of the revolving unit 3 in a case where the revolving unit 3 is positioned so that the forward direction of the revolving unit 3 is identical to the forward direction of the traveling unit 2. Then, the grip 23 is positioned behind the middle of the step 20a in the forward and backward direction of the revolving unit 3. Here, the middle of the step 20a is illustrated as a two-dot chain line in FIG. 1. Here, the step 20a may be referred to as the front step.

As shown in FIG. 3, the bottom edge section 21a of the hand rail 21 is positioned in front of the middle of the step 20b in the forward and backward direction of the revolving unit 3 in a case where the revolving unit 3 is positioned so that the forward direction of the revolving unit 3 is identical to the backward direction of the traveling unit 2. Then, the grip 23 is positioned behind the middle of the step 20b in the forward and backward direction of the revolving unit 3. Here, the middle of the step 20b is illustrated as a two-dot chain line in FIG. 3. Here, the step 20b may be referred to as the rear step.

Accordingly, the bottom edge section 21a of the hand rail 21 is positioned in front of the middle of the step 20a and the step 20b in the forward and backward direction of the revolving unit 3 in a case where the revolving unit 3 is positioned so that the forward and backward direction of the revolving unit 3 is identical to the forward and backward direction of the traveling unit 2. Then, the grip 23 is positioned behind the middle of the step 20a and the step 20b in the forward and backward direction of the revolving unit 3. That is, the step 20a and the step 20b are arranged in positions which are line symmetrical with regard to the rotation axis of the revolving unit 3. In the same manner, the step 20c and the step 20d are arranged in positions which are line symmetrical with regard to the rotation axis of the revolving unit 3.

Figure 4:
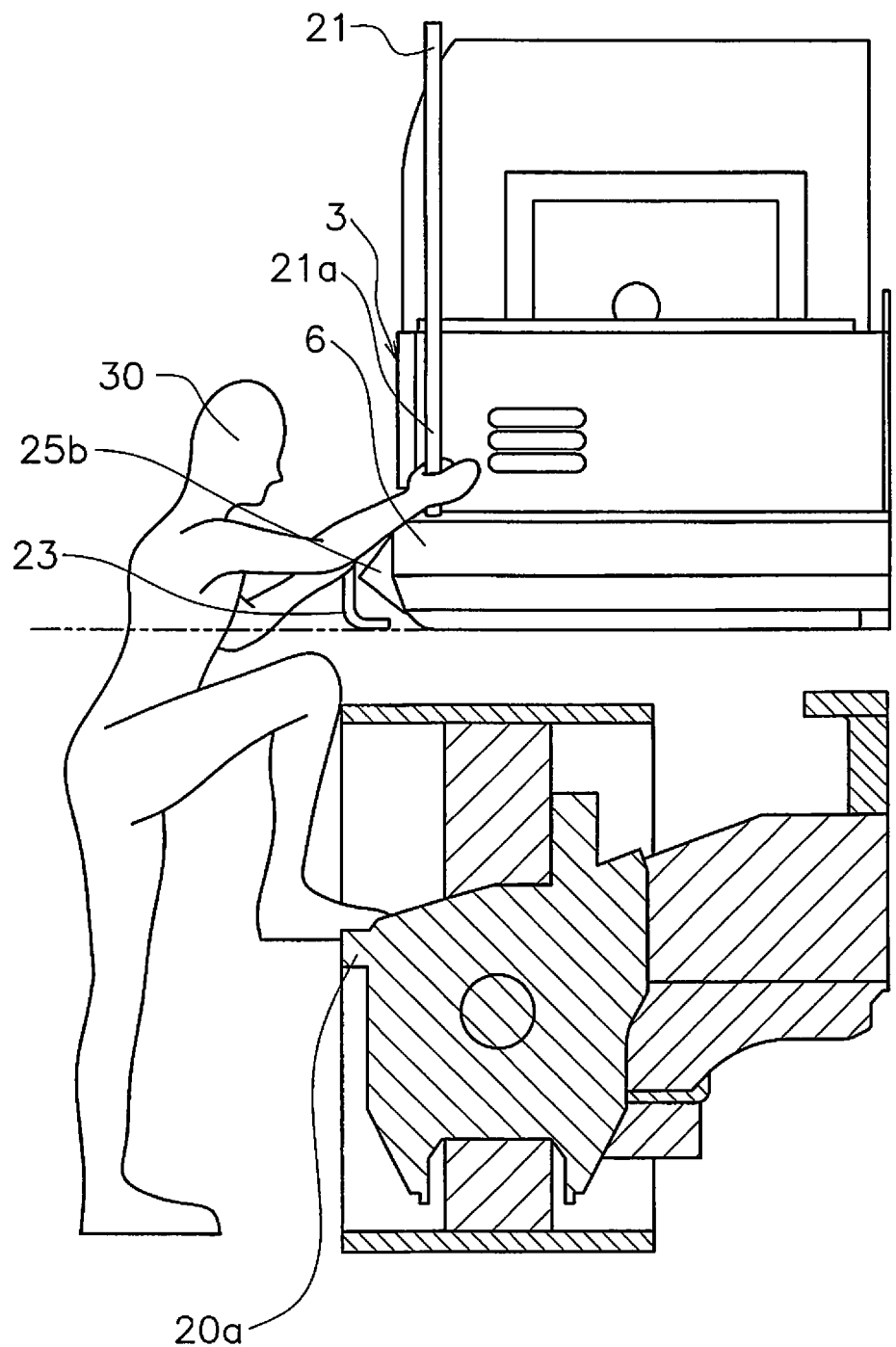
FIG. 4 is a diagram of an operator's posture of ascending a step viewed from the front of a revolving unit.
Figure 5:
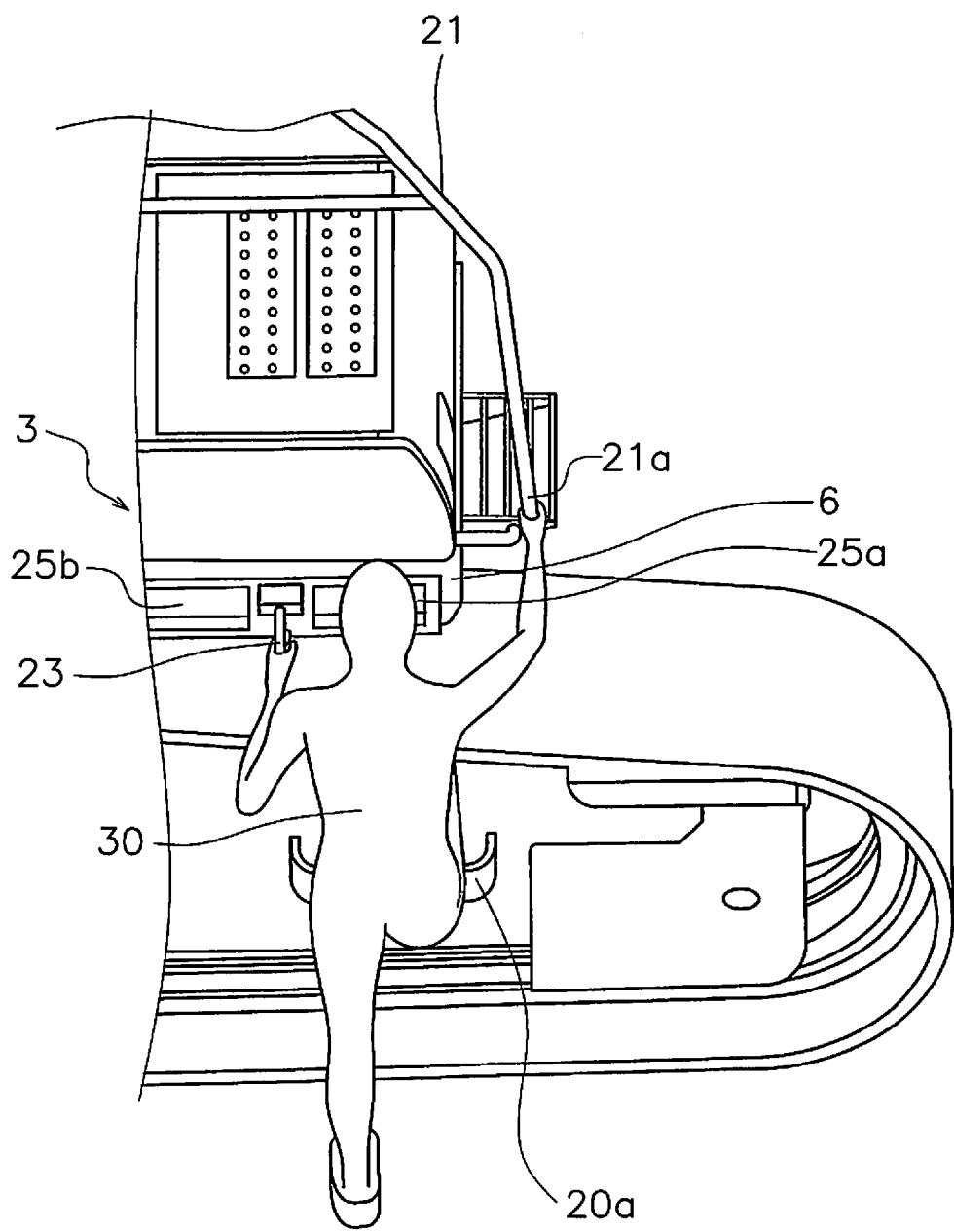
FIG. 5 is a diagram of the operator's posture of ascending the step viewed from above and obliquely to the right of the revolving unit.

FIG. 4 is a diagram of an operator's posture of ascending a step viewed from the front of the revolving unit 3. FIG. 5 is a diagram of the operator's posture of ascending the step viewed from above and obliquely to the right of the revolving unit 3. Since the step 20a, the bottom edge section 21a, and the grip 23 are arranged at the aforementioned relative positions, the operator 30 can grasp the grip 23 with the left hand and grasp the bottom edge section 21a with the right hand as shown in FIG. 4 and FIG. 5. Accordingly, the operator can ascend and descend the step 20a or the step 20b using three-point support. In addition, there can be sufficient space between the left hand and the right hand so that the operator 30 can ascend straight (without twisting of the body as in the invention according to PTL 1) from the step 20a or 20b to the crawler tracks 2i or 2j. Accordingly, the operator can easily ascend onto the revolving unit 3.

Here, the height of the bottom side of the side surface of the revolving frame is illustrated in FIG. 4 as a two-dot chain line. As shown in FIG. 4, the bottom edge of the grip 23 is positioned above the bottom side of the side surface of the revolving frame 6. This prevents dirt from hitting the grip 23.

Configuration of Deck Guard

Figure 6:
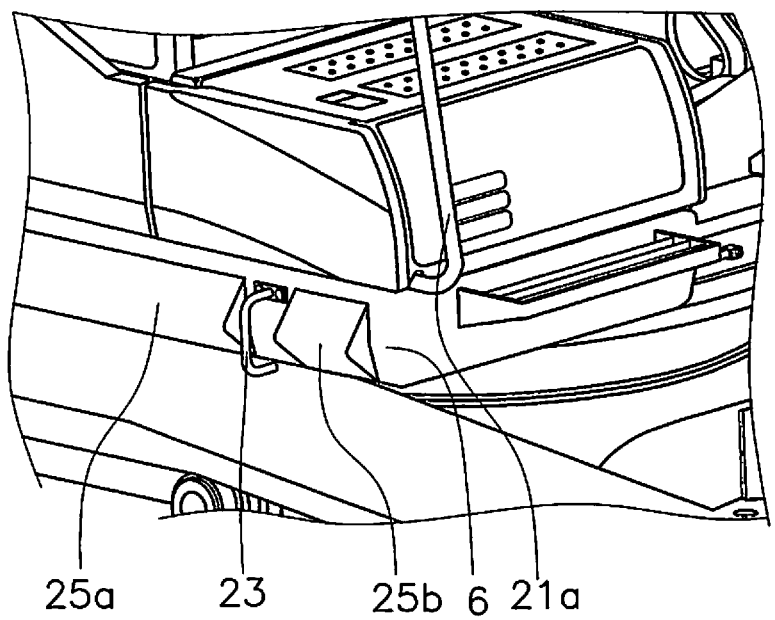
FIG. 6 is a perspective view of the vicinity of a grip.

FIG. 6 is a perspective view of the vicinity of the grip 23. As shown in FIG. 1, FIG. 2, and FIGS. 4 to 6, a first deck guard 25a and a second deck guard 25b are provided on the side surface of the revolving frame 6 where the grip 23 is positioned. The first deck guard 25a and the second deck guard 25b have a triangular column shape. The first deck guard 25a and the second deck guard 25b are arranged so that the longitudinal direction of the first deck guard 25a is identical to the longitudinal direction of the second deck guard 25b. That is, the second deck guard 25b is arranged on an extended line from the first deck guard 25a. The grip 23 is arranged on the side surface of the revolving frame 6 between the first deck guard 25a and the second deck guard 25b. Arranging the grip 23 between the first deck guard 25a and the second deck guard 25b prevents the grip 23 from directly contacting with external objects during rotation of the revolving unit 3. As such, the grip 23 is protected by the first deck guard 25a and the second deck guard 25b.

Configuration of Mirrors

As shown in FIG. 1 to FIG. 3, the revolving unit 3 includes mirrors 27a and 27b. The mirrors 27a and 27b are provided behind the grip 23 in the forward and backward direction of the revolving unit 3. The operator can check the rear on the right side of the vehicle body 1 using the mirror 27a. In addition, the operator can check the front on the right side of the vehicle body 1 using the mirror 27b. The mirrors 27a and 27b do not interfere with the operator's ascending or descending the steps 20a or 20b since the mirrors 27a and 27b are provided behind the grip 23.

Features

The hydraulic excavator 100 according to the present embodiment has the following features.

(1) The revolving unit 3 includes the hand rail 21 and the grip 23. Then, the traveling unit 2 includes the steps 20a and 20b below the hand rail 21. Accordingly, the operator can ascend or descend the steps 20a and 20b with three-point support. Therefore, the operator can easily ascend onto the revolving unit 3.

(2) The bottom edge section 21a of the hand rail 21 is positioned in front of the middle of the step 20a and the step 20b in the forward and backward direction of the revolving unit 3 in a case where the revolving unit 3 is positioned so that the forward and backward direction of the revolving unit 3 is identical to the forward and backward direction of the traveling unit 2. Then, the grip 23 is positioned behind the middle of the step 20a and the step 20b in the forward and backward direction of the revolving unit 3. Accordingly, the operator 30 can ascend straight from the step 20a or 20b to the crawler tracks 2i or 2j by grasping the grip 23 with the left hand and grasping the bottom edge section 21a with the right hand. Accordingly, the operator can easily ascend onto the revolving unit 3.

(3) The traveling unit 2 includes the two steps 20a and 20b as steps for ascending onto the revolving unit 3. Accordingly, the operator can ascend onto the revolving unit 3 in two cases of a case where the revolving unit 3 is positioned so that the forward direction of the revolving unit 3 is identical to the forward direction of the traveling unit 2 and a case where the revolving unit 3 is positioned so that the forward direction of the revolving unit 3 is identical to the backward direction of the traveling unit 2.

(4) The revolving unit 3 includes the first deck guard 25a and the second deck guard 25b and the grip 23 is positioned on the side surface of the revolving frame 6 between the first deck guard 25a and the second deck guard 25b. Accordingly, the grip 23 is protected by the first deck guard 25a and the second deck guard 25b.

(5) The bottom edge of the grip 23 is positioned above the bottom side of the side surface of the revolving frame 6. This prevents dirt from hitting the grip 23.

(6) The mirrors 27a and 27b are provided behind the grip 23 in the forward and backward direction of the revolving unit 3. Accordingly, the mirrors 27a and 27b do not interfere with the operator's ascending or descending the steps 20a or 20b.

(7) The reducing agent tank 13 is arranged at a side section where the hand rail 21 is provided, out of the right side section 3a and the left side section 3b. That is, the reducing agent tank 13 is arranged in the vicinity of the front edge of the revolving unit 3. Due to this, the reducing agent tank 13 is arranged far from the engine which is in the engine compartment 16. Accordingly, the reducing agent is insusceptible to heat from the engine.

Modified Examples

Above, an embodiment of the present invention is described but the present invention is not limited to the embodiment described above and various modifications are possible in a scope which does not depart from the gist of the invention.

In the embodiment described above, an example is described where the revolving unit 3 extends to the front due to the reducing agent tank 13 being arranged on the revolving unit 3, but the revolving unit 3 may extend to the front due to another component being arranged on the revolving unit 3.

In the embodiment described above, an example is described where the cab 5 is arranged on the left side section 3b and the hand rail 21 (including the bottom edge section 21a) is arranged on the right side section 3a, but the cab 5 may be arranged on the right side section 3a and the hand rail 21 may be arranged on the left side section 3b. In this case, the positions of the grip 23, the deck guards 25a and 25b, and the steps 20a and 20b are changed corresponding to the position of the hand rail 21.

The steps 20c and 20d may be omitted. In addition, one of the steps 20a and 20b may be omitted. Furthermore, the mirrors 27a and 27b and the deck guards 25a and 25b may be omitted.

INDUSTRIAL APPLICABILITY

The present invention is effective in the viewpoint such that an operator can easily ascend onto a revolving unit in a hydraulic excavator where the revolving unit extends to the front and positions of steps are positioned relatively to the rear in comparison to the front edge of the revolving unit.

The invention claimed is:

1. A hydraulic excavator comprising:
   a traveling unit; and
   a revolving unit mounted on the traveling unit, the revolving unit including
      a revolving frame as a base
      a right side section on a right side in a left and right direction of the revolving unit with respect to a center line of the revolving unit, the center line extending in a forward and backward direction of the revolving unit, and
      a left side section on a left side in the left and right direction of the revolving unit with respect to the center line,
      a cab provided at a first of the right side section or the left side section,
      a hand rail provided at a front edge on a second of the right side section or the left side section, the hand rail extending upward from the front edge toward a rear of the revolving unit, and
      a grip provided below the hand rail and on a side surface of the revolving frame, and
   the traveling unit including
      a track frame,
      a step provided on a side surface of the track frame below the hand rail; and
      a rear step,
      when the revolving unit is positioned such that the forward direction of the revolving unit is identical to the backward direction of the traveling unit, the bottom edge section of the hand rail at the front edge is positioned in front of a middle of the rear step along the forward and backward direction of the revolving unit, and the grip is positioned behind the middle of the rear step along the forward and backward direction of the revolving unit,
   the grip being formed in a U-shape and extending in the vertical direction, a bottom end portion of the grip extending toward the revolving frame, and
   a tip end of the bottom end portion of the grip being separated from the revolving frame.

2. The hydraulic excavator according to claim 1, wherein the step is a front step, and
   when the revolving unit is positioned such that the forward direction of the revolving unit is identical to the forward direction of the traveling unit, the bottom edge section of the hand rail at the front edge is positioned in front of the middle of the front step along the forward and backward direction of the revolving unit, and the grip is positioned behind the middle of the front step along the forward and backward direction of the revolving unit.

3. The hydraulic excavator according to claim 2, wherein the revolving unit further includes
   a first deck guard provided on the side surface of the revolving frame where the grip is positioned, and
   a second deck guard arranged on an extension line of the first deck guard, and
   the grip is arranged on the side surface of the revolving frame between the first deck guard and the second deck guard.

4. The hydraulic excavator according to claim 1, wherein the revolving unit further includes
   a first deck guard provided on the side surface of the revolving frame where the grip is positioned, and
   a second deck guard arranged on an extension line of the first deck guard, and
   the grip is arranged on the side surface of the revolving frame between the first deck guard and the second deck guard.

5. The hydraulic excavator according to claim 2, wherein a bottom edge of the grip is positioned above a bottom side on the side surface of the revolving frame.

6. The hydraulic excavator according to claim 5, wherein the revolving unit further includes a mirror provided behind the grip along the forward and backward direction of the revolving unit.

7. The hydraulic excavator according to claim 1, wherein the revolving unit further includes
   an engine,
   a selective catalytic reduction apparatus configured to treat exhaust from the engine, and
   a reducing agent tank configured to store a reducing agent, and
   the reducing agent tank is arranged at a side section of the second of the right side section or the left side section where the hand rail is provided.

8. The hydraulic excavator according to claim 1, wherein the cab is arranged at the left side section, and
   the hand rail is arranged at the right side section.

* * * * *